United States Patent
Maloney et al.

(10) Patent No.: US 11,247,447 B2
(45) Date of Patent: Feb. 15, 2022

(54) ROTATABLE SELF-LAMINATING MARKERS (71) Applicant: Brady Worldwide, Inc., Milwaukee, WI (US)

(72) Inventors: James W. Maloney, Shorewood, WI (US); Harry J. Miesner, Jr., Wauwatosa, WI (US); Peter J. Rankin, Brookfield, WI (US)

(73) Assignee: Brady Worldwide, Inc., Milwaukee, WI (US)

( * ) Notice: Subject to any disclaimer, the term of this patent is extended or adjusted under 35 U.S.C. 154(b) by 0 days.

(21) Appl. No.: 16/422,310

(22) Filed: May 24, 2019

(65) Prior Publication Data
US 2019/0366700 A1 Dec. 5, 2019

Related U.S. Application Data (60) Provisional application No. 62/679,635, filed on Jun. 1, 2018.

(51) Int. Cl.
*B32B 37/14* (2006.01)
*G09F 3/00* (2006.01)
*G09F 3/02* (2006.01)

(52) U.S. Cl.
CPC ......... *B32B 37/142* (2013.01); *G09F 3/0295* (2013.01); *B32B 2519/00* (2013.01);
(Continued)

(58) Field of Classification Search
CPC . B32B 37/142; B32B 2519/00; G09F 3/0295; G09F 2003/0201; G09F 3/205;
(Continued)

(56) References Cited

U.S. PATENT DOCUMENTS 3,931,426 A 1/1976 Braun et al.
5,225,162 A 7/1993 Scoville
(Continued)

FOREIGN PATENT DOCUMENTS

EP 0093000 A2 11/1983
EP 2348459 A1 7/2011
(Continued)

OTHER PUBLICATIONS

[NPL-1] "just"; The Free Dictionary (Sep. 2020); <https://www.thefreedictionary.com/just>. (Year: 2020).*
(Continued)

*Primary Examiner* — David Sample
*Assistant Examiner* — Donald M Flores, Jr.
(74) *Attorney, Agent, or Firm* — Quarles & Brady LLP (57) ABSTRACT

A rotatable self-lam for attachment to an elongate object can be made by variations to conventional self-lams. In some forms, the rotatable self-lam can be made by folding a portion of the head end of the self-lam onto itself to provide an adhesive-free length which is first wrapped around the elongate object during marker application. In other forms, a bifurcated release liner can have a portion proximate the head end of the marker which can be removed to help template or accommodate the fold to create the adhesive-free length or can have a portion proximate the head end which is retained when the portion proximate the tail end is removed such that the retained portion of the release liner provides an adhesive-free surface during application.

18 Claims, 4 Drawing Sheets

(52) U.S. Cl.
CPC ..... *G09F 2003/0201* (2013.01); *Y10T 428/14* (2015.01); *Y10T 428/149* (2015.01); *Y10T 428/1476* (2015.01); *Y10T 428/1486* (2015.01); *Y10T 428/15* (2015.01)

(58) Field of Classification Search
CPC ...... G09F 3/10; Y10T 428/14; Y10T 428/149; Y10T 428/1486; Y10T 428/1476; Y10T 428/15
USPC ........ 428/40.1, 33, 914, 41.8, 42.1, 42.2, 43
See application file for complete search history.

(56) References Cited

U.S. PATENT DOCUMENTS

| | | |
|---|---|---|
| 8,263,201 B2 | 9/2012 | Caveney et al. |
| 2011/0268897 A1* | 11/2011 | Klemann .............. G09F 3/0295 428/32.19 |
| 2017/0154549 A1* | 6/2017 | Martial .................... G09F 3/10 |

FOREIGN PATENT DOCUMENTS

| | | |
|---|---|---|
| EP | 2581897 A1 | 4/2013 |
| JP | 2016071030 A | 5/2016 |

OTHER PUBLICATIONS

[NPL-1] Laser Inkjet Labels, "Clear Gloss Labels"; (Jun. 6, 2017); <https://laserinkjetlabels.com/pages/clear-glossy-labels/>. (Year: 2017).*
European Patent Office, Extended European Search Report, Application No. 19177369.6, dated Nov. 13, 2019, 9 pages.

* cited by examiner

FIG. 5

ROTATABLE SELF-LAMINATING MARKERS

CROSS-REFERENCE TO RELATED APPLICATION

This application claims the benefit of U.S. Provisional Application No. 62/679,635 filed Jun. 1, 2018. The contents of that application are hereby incorporated by reference for all purposes as if set forth in their entirety herein.

FIELD OF INVENTION

This disclosure relates self-laminating markers such those that can be used to label cables or wires.

BACKGROUND

Self-laminating markers are well known and can be used to label wires, cables or other elongate objects.

Figure 1A:
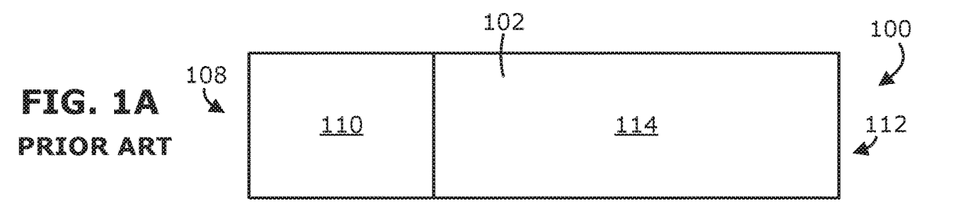
FIGS. 1A-1C schematically illustrates a top view in FIG. 1A, a bottom view in FIG. 1B, and a side view in FIG. 1C of a self-laminating marker according to the known state of the art.
Figure 1B:
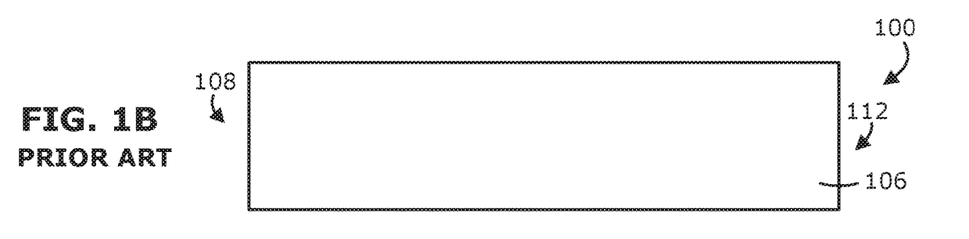
Figure 1C:
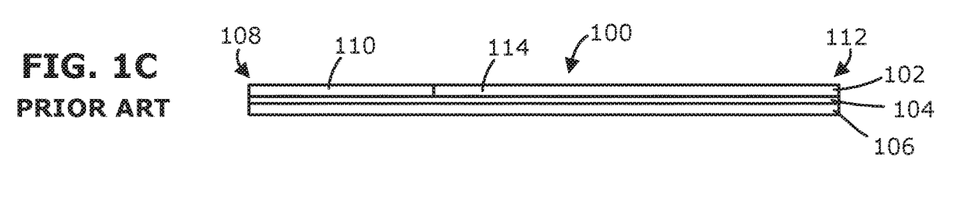

FIGS. 1A-1C show top, bottom, and side views of an exemplary conventional self-laminating marker 100. As illustrated, the self-laminating marker 100 is a thin, rectangular body generally comprising three layers including (from top to bottom) a substrate 102, an adhesive 104, and a removable liner 106. The substrate 102 has a head end 108 with an opaque printable area 110 on one side which is a printable layer on top of a clear film layer and a tail end 112 with a transparent area 114 of just the clear film layer on the other. It is noted that this exact layer structure is not illustrated in the figures (i.e., printable layer—clear film layer—adhesive layer), but that the opaque and transparent areas are generally depicted.

In typical use, an upwardly-facing surface of the printable area 110 is printed upon in a region close to where the printable area 110 meets the transparent area 114. The printing could be, for example, performed by a printing device or manually with a pen or other writing implement. In the case of printing by printer, the markers 100 may be provided as part of a media roll or strip, with each of the individual markers being separable from the roll or strip. With the printing completed on the printable area 110 (and the marker 100 cut or separated from any greater length of media), the release liner 106 may then be removed from the marker 100 to expose the adhesive 104 on the lower surface of the substrate 102. After being exposed, the adhesive 104 at the head end 108 is contacted to the elongate object to affix the head end 108 to the object. With the head end 108 attached to the object, the tail end 112 of the substrate 102 can now be wrapped around the object about the central axis of the object such that the adhesive 104 contacts the outer profile of the object initially and then, after having been wrapped around one full rotation, back onto the upper surface of the substrate 102 itself initially contacting the first part of the head end 108 attached to the object. This wrapping of the substrate 102 of the marker 100 back upon itself and around the object continues until there is no more substrate left. This is generally indicated in FIG. 6, which is also described in greater detail below. During this wrapping, the print is on the last part of the head end 108 of the substrate 102 that is affixed to the object and, as the wrapping further progresses, the transparent area 114 of the tail end 112 then wraps over the print in order to cover the print and protect the print while still permitting the print to be viewable through the clear film of the transparent area 114.

Following the attachment progression described above, it can be appreciated that, while the self-laminating marker 100 can be useful for attaching and providing viewable printed matter on a wire or cable, the attached marker 100 may only be viewable from certain orientations about the object when the marker 100 is directly affixed to the object itself.

In order to provide a more versatile, rotatable self-laminating marker, U.S. Pat. No. 8,263,201 proposes a self-lam construction in which the head end of the marker includes both a breakaway adhesive-containing section (which is first attached to the wire) and an adhesive-free length between the breakaway adhesive-containing section and the tail end (with the tail end again having adhesive thereon). Implementing this design and the general application process described above, such a self-lam can be first attached to the object by fully wrapping the self-lam around the object and then rotating the self-lam relative to the object to separate the breakaway adhesive-containing section from the remainder of the self-lam, which is then able to rotate about the object because the adhesive-free length can freely slide around the periphery of the object.

However, such a self-lam design as in U.S. Pat. No. 8,263,201 presents some presentation and usability concerns. For one, after rotating the attached self-lam to separate the breakaway section from the remainder of the marker, the breakaway section remains fixed on the object where it was initially attached. Further still, wrapping the marker onto itself tightly may create compression or friction, even in the non-adhesive covered section, that may make rotating the attached marker difficult for breaking away the attached section from the rotatable portion of the marker.

SUMMARY

Various structures and methods are disclosed herein that provide self-lams that can be rotated around the wire, cable, or elongate object and in which the marker can be axially repositioned after the marker has applied.

According to one aspect, a method of manipulating a marker having a substrate including a head end with a printable area and a tail end with a transparent area in which the substrate has an adhesive on one side thereof is provided. In the broadest sense, the method involves folding a length of the head end of the substrate of the marker onto itself, thereby creating an adhesive-free surface on the side of the substrate having adhesive. During application to an elongate object, the adhesive-free surface can be positioned adjacent outer periphery of the object to prevent adhesion thereto.

In some forms, there can be fold marks (which may be, for example, visual indicia on the marker or perforations) which help guide or assist in executing the fold.

In some forms, there may be bifurcated release liner and a portion of the release liner on the head end can be initially removed to expose adhesive only in a region which the head end is to be folded upon itself. Only when the marker is to be applied to the elongate object is the other part of the bifurcated release liner removed to expose the adhesive on the tail end.

According to another aspect, a method of manipulating a marker of the type described above is provided in which the marker includes a removable release liner which is bifurcated at a score line. A portion of the removable release liner up to the score line is removed to expose the adhesive proximate the tail end of the marker, but a portion of the release liner is maintained over the adhesive proximate the head end. The marker is then wrapped around the elongate object—with the portion of the removable release liner proximate the head end still on the marker—thereby providing an adhesive-free interface between the marker and the elongate object.

According to still another aspect, a marker for wrapping around an elongate object is provided. The marker includes a substrate including a head end with a printable area and a tail end with a transparent area and further includes an adhesive covering one side of the substrate. One or more fold mark are on the substrate which are indicative of a position at which the marker is to be folded upon itself to provide a pre-established length for the adhesive-free surface on the side of the marker otherwise having the adhesive.

According to another aspect, a marker having a substrate including a head end with a printable area and a tail end with a transparent area and further having an adhesive covering one side of the substrate can still further include a release liner with a score line providing a portion of the release liner proximate the head end and a portion of the release liner proximate the tail end. This bifurcated release liner concept can potentially accommodate various usage modes described herein (including retaining the portion of the liner at the head end such that that liner provides an adhesive-free interface without folding or including initially removing this portion of the liner to accommodate the folding of the head end onto itself without further exposing the adhesive on the tail end at that point in the process).

While various modes of usage and structure are described above and below, it will be appreciated that all workable combinations and permutations of the described features are contemplated.

These and still other advantages of the invention will be apparent from the detailed description and drawings. What follows is merely a description of some preferred embodiments of the present invention. To assess the full scope of the invention the claims should be looked to as these preferred embodiments are not intended to be the only embodiments within the scope of the claims.

BRIEF DESCRIPTION OF THE DRAWINGS

FIGS. 2A-2E schematically illustrate a novel method of preparing a marker for attachment onto an object by folding part of the head end.

DETAILED DESCRIPTION

In the sections below, similar references numerals will be used to describe features common among the various embodiments and those features found in the prior art marker 100 described in the background section above with respect to FIGS. 1A-1C. However, for each different embodiment a different 100's series will be used to denote the different embodiment (i.e., a second marker 200 according to a second embodiment, a third marker 300 according to a third embodiment, and so on).

Figure 5:
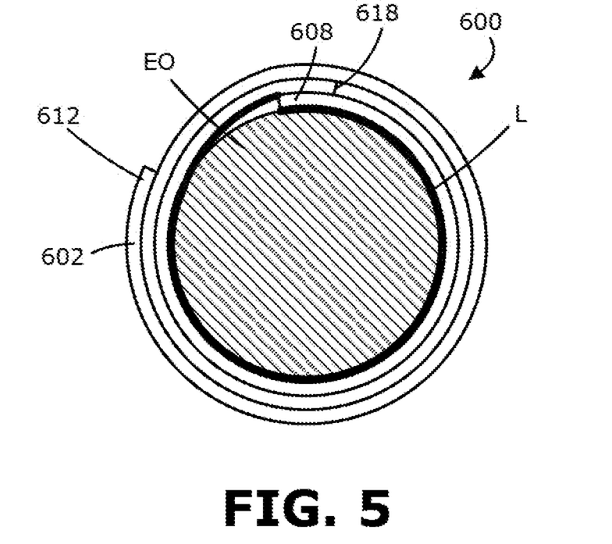
FIG. 5 schematically illustrates an as wrapped marker in which the interface or length that is to be adhesive free is illustrated.

Referring first to FIG. 5, a schematic of an as-wrapped marker 600 is shown, indicating the placement of the head end 608 on an elongate object EO, with the tail end 612 wrapped over and around it. A border 618 indicates the change in material from the head end 608 to tail end 612. Although not depicted in this drawing for the sake of clarity, the adhesive layer would be on the side of the substrate 602 that faces radially inward toward the elongate object EO.

Notably, there is a length L denoted by a thicker line, which is typically adhesive-covered and attaches the marker 600 to the elongate object EO. In the various marker structures that are described herein and below specifically, the structures of the markers have been modified or altered in order to eliminate the adhesive along this line of contact.

Referring now to FIG. 2A-2E, one method of modifying a marker prior to application is provided which results in the as-applied marker being rotatable after application. In this method, a portion of the marker 200 is folded upon itself pre-application in order to create a non-adhesive bearing surface which contacts the outer periphery of the object to which the marker 200 is being attached.

Figure 2A:
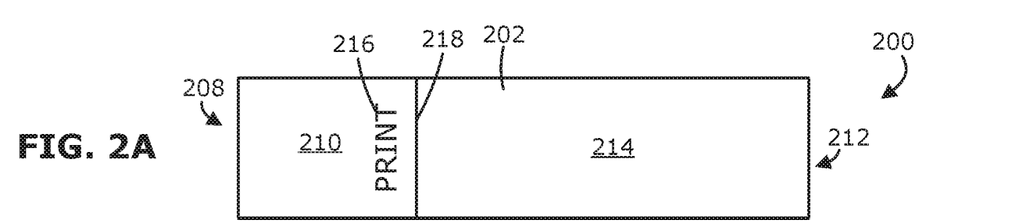
FIG. 2A provides a top view of an exemplary marker in its initial configuration.
Figure 2B:
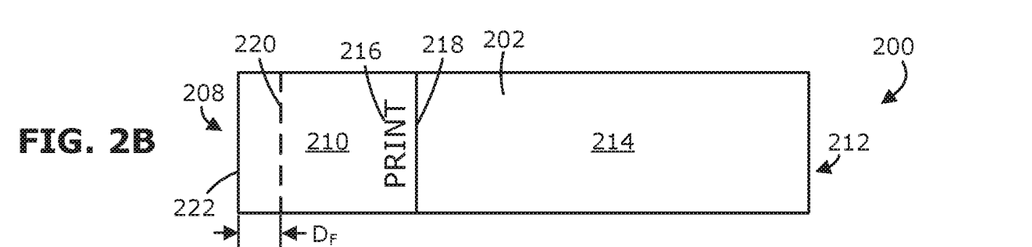
FIG. 2B illustrates this marker with a fold line denoted on its head end.
Figure 2C:
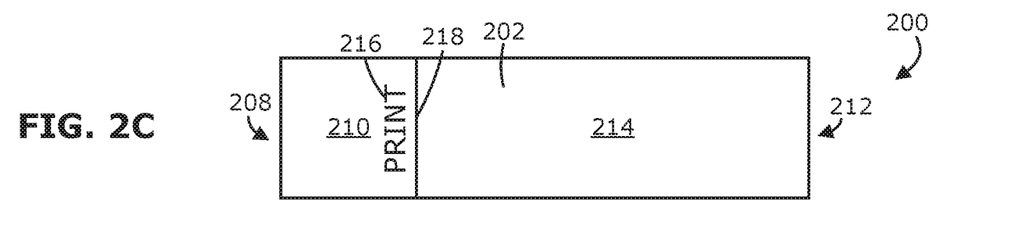
FIGS. 2C, 2D, and 2E show this marker after the liner has been removed and a portion of the head end has been folded over onto itself.
Figure 2D:
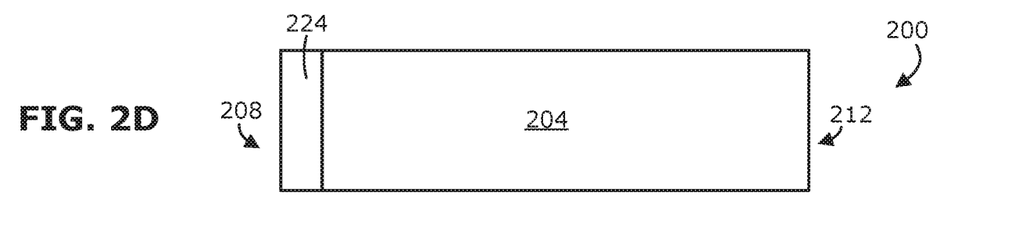
Figure 2E:
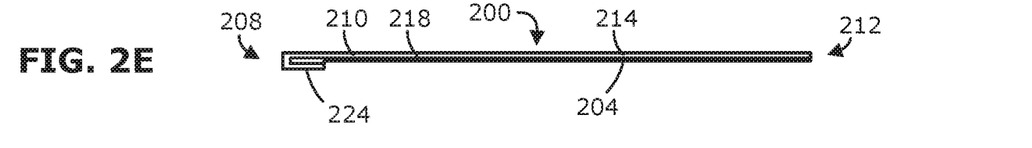

The steps of this method will now be described sequentially. First, as, illustrated in FIG. 2A, print 216 is applied to the marker 200 on the opaque printable area 210 by the end user or a printing device. Ideally, this print 216 is applied as close to the border 218 between the head end 208 and the tail end 212 as is reasonable. Next, with reference to FIG. 2B, the end user picks a spot along each side of the marker 200 across which he or she will fold the marker 200 onto itself. This fold mark 220 is denoted by a dashed line on the unfolded marker 200 of FIG. 2B. In order to ensure that the as-attached marker will be rotatable after being applied the location of the fold mark 220 relative to the edge 222 of the head end 208 (denoted by distance $D_F$) should be greater that the distance around the outer periphery of the object to which the marker 200 will be attached (typically a circumference in a wire or label). After removing the liner—which is not shown in FIG. 2A or 2B because only the top views are shown—the end user folds the marker 200 onto itself along the fold mark 220, bring the adhesive sides of the marker 200 together over at least a portion of the head end 208 to create the folded marker structure illustrated in FIGS. 2C-2E. As best illustrated in FIGS. 2D and 2E, which show the bottom and side views of the folded marker 200 respectively, this manipulation leaves a marker 200 with a small, essentially adhesive-free surface 224 on the bottom side thereof at the leading edge of the marker 200 while the remainder of the bottom side has exposed adhesive 204.

The end user can then apply this manipulated marker 200 to the wire/cable/object in the same manner as one would apply a typical self-lam, starting with the leading edge of the head end 208, adhesive 204 facing downward. The difference in this application is that the leading edge of the marker 200 is now the adhesive-free surface 224 and will not stick to the wire/cable/object. The user will first contort the marker 200 in the beginning around the wire/cable/object and, eventually, as this wrapping motion continues, the exposed adhesive 204 on the bottom of the marker 200 will start sticking to the substrate 202 and the application will then proceed as it would with a typical self-lam. What is atypical is that on account of this folding manipulation to the marker 200 prior to application, the marker 200 is now free to rotate around the outer periphery or circumference of the wire/cable/object post-application. Because the adhesive-free surface 224 is applied to the surface of the wire/cable/ object in this case, no adhesive force inhibits the rotation or movement of the marker 200 relative to the wire/cable/ object.

Figure 3A:
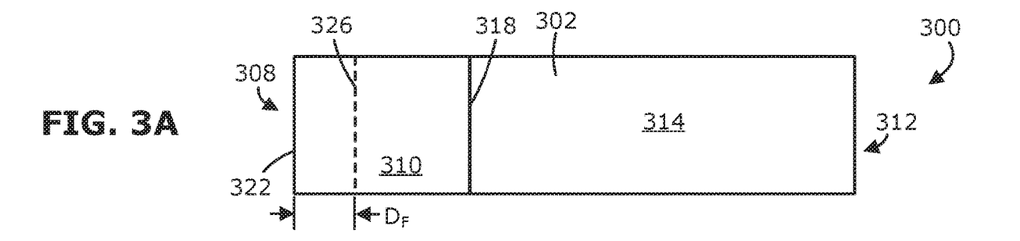
FIGS. 3A and 3B schematically illustrate two markers having a single perforation or multiple perforations, respectively, to direct a folding of a portion of the head end of the marker onto itself.
Figure 3B:
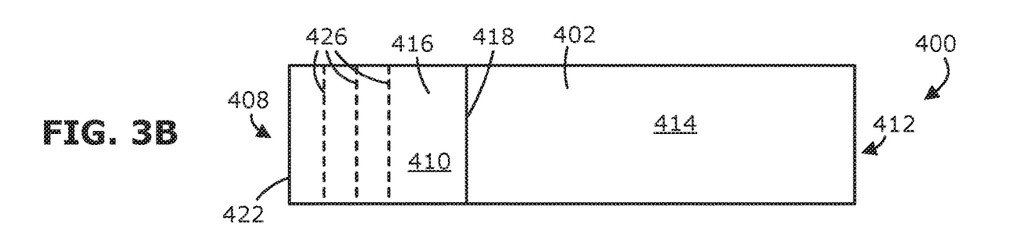

Referring first to FIGS. 3A and 3B, a pair of markers 300 and 400 are illustrated in which one or more guiding perforations have been added in order to better accommodate the folding of a marker as illustrated generally in the method of FIGS. 2A-2E.

Looking first at FIG. 3A, a perforation 326 is supplied congruous with the desired fold line for the marker 300. Again, this is spaced a distance $D_F$ from the leading edge 322 which is selected to be a distance in excess of the distance of the outer periphery of the wire/cable/object to which the marker 300 is to be attached. Including this perforation 326 in the marker 300 has the added benefits of (a) removing from the end user the requirement of ascertaining where the fold should take place, (b) facilitating an easier fold, and (c) ensuring a clean fold, with a straight edge along it and ensuring that the line of the fold is at a proper right angle to the long side of the marker 300.

Turning now to FIG. 3B, another marker 400 is shown including a plurality of perforations 426 at a plurality of distances from the leading edge 422. In this design, the marker 400 offers the end user with various, preselected distances at which the fold line can be accommodated. The respective plurality of distances can be selected to correspond to various wire/cable circumferences such that a single style marker 400 can usefully applied to various sizes of wire/cable. Still further, the user can be presented with a table or other information providing various diameters or classes of cable and providing information about the appropriate perforation line 426 to be selected to accommodate that size of wire or cable.

While the perforation lines 426 have been equally spaced in the form illustrated (from one another or, in one instance, from the leading edge 422), in other embodiments the perforation lines do not need to be equally spaced.

It is further contemplated that the release liner itself could be scored for partial removal (initially) in order to only expose the portion of the adhesive surface upon which the marker is to be folded upon itself, instead of fully removing the release liner.

Figure 4A:
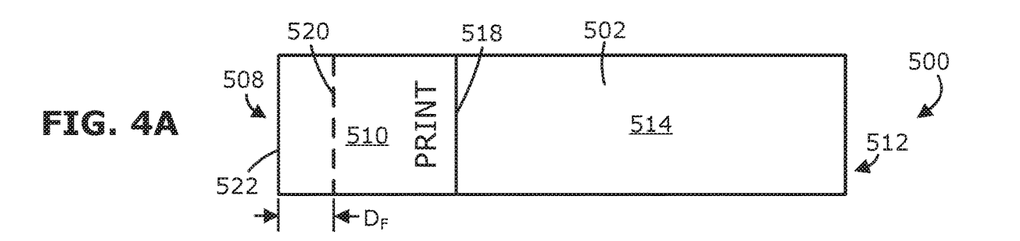
FIGS. 4A-4C schematically illustrate a top view, a bottom view, and side view respectively of a marker design with a segmented or scored release liner.
Figure 4B:
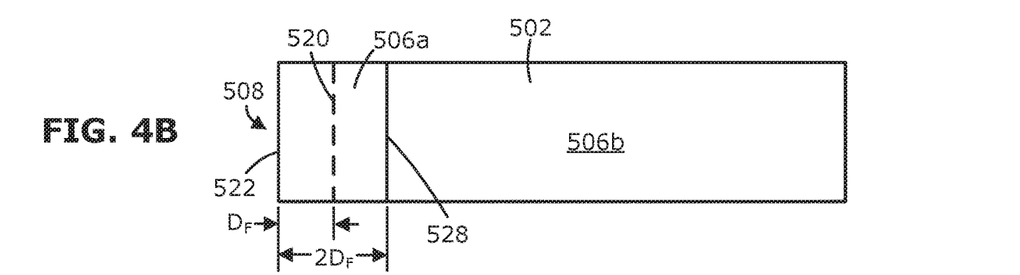
Figure 4C:
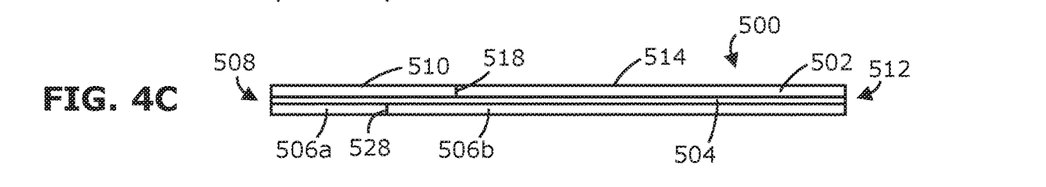

Turning now to FIGS. 4A-4C, a top side and a bottom side of a marker 500 are respectively illustrated having a desired fold line 520 having a distance ($D_F$) from the leading edge 522. The liner has a score line 528 which is at a distance ($2D_F$) from the leading edge 522 equal to twice the distance between the intended fold line 520 and the leading edge 522. As best shown in the bottom side view of FIG. 4B, this score line 528 bifurcates the liner into two parts: liner head part 506a covering the leading edge 522 to the score line 528 and liner body part 506b which extends from the score line 528 to the end of the tail end 512. In preparation of the fold, the liner head part 506a can be removed while the liner body part 506b may remain on the substrate 502 and adhesive 504. With the liner head part 506a removed, where the score line 528 was previously located (and which is still indicated by the remaining edge of liner body part 506b) becomes a guide line for alignment with the leading edge 522 in preparing and making the fold.

It should be appreciated that while FIGS. 4A-4C depict a structure in which the score line is twice the distance from the desired fold line, that the score line may not be exactly twice the distance from the leading edge to the desired fold line. In actuality, the score line can be at least twice the distance from the leading edge to the score line or more. When the distance to the score line exceeds the twice the distance of the fold, the amount of adhesive-less area after the fold is simply increased or some small amount of adhesive might remain exposed between the adhesive-less surface and the tail end portion of the liner. However, this distance from the leading edge to the score line should not be less than twice the distance from the leading edge to the desired fold line because, in that case, the length of the adhesive-less area would not be sufficiently long to span the distance L generally corresponding to the length of the outer circumference or periphery of the object to which the marker is attached.

Thus, the fold can be executed for a marker while only exposing the amount of adhesive area necessary to make the fold. In this way and in contrast to full liner removal, the adhesive of the marker can be prevented from sticking to itself in regions other than those desired while the user attempts to make the fold through wrinkling or warping. Still further, it can avoid weakening the adhesive via exposure to contaminants in the atmosphere, which might occur if the full liner is removed and there is a delay before application to the wire/cable object either while the fold is being made or post-fold, but pre-application.

Once the fold is made, another advantage of this structure is that the liner body part 506b can remain on until such a time that the user desires to apply the marker 500 and no adhesive is exposed until the liner body part 506b is removed. It is contemplated that a user could prepare a set of markers having these pre-folds and that they could be applied in batches only further requiring the removal of the liner body part 506b and the wrapping of the marker 500 around the wire/cable/object.

It is also contemplated that the marker 500 of FIGS. 4A-4C might be used in a different way to obtain a rotatable self-lam. In some instances, the user could retain the head liner part 506a in place and only remove the tail liner part 506b prior to application with no folding occurring. In this configuration, the head liner part 506a would engage the surface of the wire/cable/object and separate the remainder of the marker 500 from the wire/cable/object without interposed adhesive. This usage configuration of the marker 500 might be preferable for particularly larger objects in which folding the head onto itself to create the adhesive free surface would not create a sufficient length for the outer periphery or circumference to be covered. However, it would also be the case that the length of the head liner part 506a would need to be selected to have a length exceeding the length of the outer periphery or circumference of the object to which the marker 500 would be attached in this way so that the adhesive beneath the liner tail part 506b would not adhere to the object.

While various specific embodiments have been described, it is contemplated that various workable combinations and permutations of the design elements described above could be combined with one another. As one example, there could be one or more fold lines or perforations on the substrate to guide the folding action and a scored removable liner having one or more removable sections.

As noted above, it should be appreciated that various other modifications and variations to the preferred embodiments can be made within the spirit and scope of the invention. Therefore, the invention should not be limited to the described embodiments. To ascertain the full scope of the invention, the following claims should be referenced.

What is claimed is:

1. A marker for wrapping around an elongate object in which the marker is self-laminating with a tail end with a transparent area that is wrappable over a printable area on a head end to laminate the printable area, the marker comprising:
   a substrate including the head end with the printable area that is opaque and the tail end with the transparent area;
   an adhesive covering one side of the substrate; and
   at least one fold mark on the substrate indicative of a position at which the marker is to be folded upon itself to provide a pre-established length for an adhesive-free surface on the one side of the substrate having the adhesive;
   wherein the marker includes a plurality of fold marks at the head end indicative of a corresponding plurality of positions at which the marker is foldable upon itself at the head end to provide a corresponding one of a plurality of pre-established lengths for the adhesive-free surface at the head end and further wherein the plurality of fold marks are selected from the group consisting of visual indicia on the marker and perforations;
   wherein the marker is an elongated rectangle;
   wherein the at least one fold mark extends transversely across the elongated rectangle in a shorter dimension of the elongated rectangle; and
   wherein the tail end with the transparent area is longer along a longer dimension of the elongated rectangle than the head end with the printable area.

2. The marker of claim 1, wherein the at least one fold mark is a perforation that assists in positioning a fold.

3. The marker of claim 1, wherein the transparent area of the tail end of the substrate is just a clear film layer.

4. The marker of claim 1, wherein the plurality of fold marks at the head end are in the printable area.

5. The marker of claim 1, wherein, upon wrapping the marker around the elongate object, the adhesive-free surface at the head end encircles an outer periphery of the elongate object before the tail end with the transparent area is wrapped over the printable area to laminate the printable area, thereby both laminating the printable area and enabling the rotation of the marker about the elongate object by virtue of the adhesive-free surface not sticking to the elongate object.

6. A marker for wrapping around an elongate object in which the marker is self-laminating with a tail end with a transparent area that is wrappable over a printable area on a head end to laminate the printable area, the marker comprising:
   a substrate including the head end with the printable area that is opaque and the tail end with the transparent area of just a clear film layer;
   an adhesive covering one side of the substrate; and
   a release liner with a score line bifurcating the release liner into a portion of the release liner proximate the head end and a portion of the release liner proximate the tail end;
   wherein the marker is an elongated rectangle;
   wherein the score line extends transversely across the elongated rectangle in a shorter dimension of the elongated rectangle; and
   wherein the tail end with the transparent area is longer along a longer dimension of the elongated rectangle than the head end with the printable area.

7. The marker of claim 6, wherein the score line is positioned such that the portion of the release liner proximate the head end has a length from a leading edge of the head end to the score line, with the length being at least twice a desired length of an adhesive-free surface, such that once the portion of the release liner proximate the head end is removed the leading edge can be folded to align with the score line to fold the head end onto itself at the adhesive and provide the adhesive-free surface having the desired length.

8. The marker of claim 7, further comprising a perforation on the substrate at a position corresponding to one half of the length between the leading edge of the head end and the score line in which the perforation accommodates an execution of folding of the head end onto itself.

9. The marker of claim 7, wherein, upon wrapping the marker around the elongate object, the adhesive-free surface at the head end encircles an outer periphery of the elongate object before the tail end with the transparent area is wrapped over the printable area to laminate the printable area, thereby both laminating the printable area and enabling the rotation of the marker about the elongate object by virtue of the adhesive-free surface not sticking to the elongate object.

10. The marker of claim 6, wherein the score line is positioned such that the portion of the release liner proximate the head end has a length exceeding a desired length of an adhesive-free surface for direct reception around an elongate object without folding.

11. The marker of claim 10, wherein, upon wrapping the marker around the elongate object, the adhesive-free surface at the head end encircles an outer periphery of the elongate object before the tail end with the transparent area is wrapped over the printable area to laminate the printable area, thereby both laminating the printable area and enabling the rotation of the marker about the elongate object by virtue of the adhesive-free surface not sticking to the elongate object.

12. A method of manipulating the marker of claim 1 for attachment onto an elongate object by wrapping the marker around the elongate object, the method comprising:
   folding a length of the head end of the substrate of the marker onto itself, thereby creating the adhesive-free surface on the side of the substrate having adhesive.

13. The method of claim 12, further comprising the step of wrapping the marker around the elongate object to attach the marker thereto by first wrapping the adhesive-free surface of the marker around an outer periphery of the elongate object before the adhesive is wrapped onto an upper surface of the substrate to cover the printable area, thereby providing an adhesive-free interface between the marker and the elongate object, permitting the rotation of the marker about the elongate object.

14. The method of claim 12, wherein the plurality of fold marks that are each perforations.

15. The method of claim 12, wherein the marker includes a release liner covering the adhesive and at least a portion of the release liner is removed before folding a length of the head end of the substrate of the marker onto itself.

16. The method of claim 15, wherein the release liner is bifurcated by a score line and wherein the method further includes removing a portion of the release liner proximate the head end of the marker before folding the length of the head end of the substrate of the marker onto itself and in which the step of folding the length of the head end of the substrate of the marker onto itself entails aligning a leading edge of the head end with the score line.

17. The method of claim 15, further comprising the step of removing the portion of the release liner proximate the tail end after the step of folding.

18. A method of manipulating a marker of claim 6 in which the marker is adapted for attachment onto an elongate object by wrapping the marker around the elongate object, the method comprising:
- removing a portion of the removable release liner up to the score line on the removable release liner in which the score line bifurcates the release liner to expose the adhesive proximate the tail end of the marker but to maintain the portion of the release liner over the adhesive proximate the head end; and
- wrapping the marker around the elongate object with the portion of the removable release liner proximate the head end still on the marker thereby providing an adhesive-free interface between the marker and the elongate object.

\* \* \* \* \*